(12) United States Patent
Kalmbach et al.

(10) Patent No.: US 6,640,854 B2
(45) Date of Patent: Nov. 4, 2003

(54) MACHINING ASSEMBLY INCLUDING A ROTATING TOOL AND EXHAUST HOOD

(75) Inventors: Kurt Kalmbach, Alpirsbach (DE); Wilhelm Kalmbach, Schopfloch (DE); Hans-Jürgen Gittel, Rottenburg (DE); Ewald Westfal, Balingen (DE)

(73) Assignee: Ledermann GmbH, Horb (DE)

( * ) Notice: Subject to any disclaimer, the term of this patent is extended or adjusted under 35 U.S.C. 154(b) by 0 days.

(21) Appl. No.: 10/097,346

(22) Filed: Mar. 15, 2002

(65) Prior Publication Data

US 2003/0106613 A1 Jun. 12, 2003

Related U.S. Application Data

(63) Continuation of application No. PCT/EP00/08630, filed on Sep. 4, 2000.

(30) Foreign Application Priority Data

Sep. 17, 1999 (DE) .......................................... 199 44 728

(51) Int. Cl.[7] ........................... B27G 21/00; B24B 55/06
(52) U.S. Cl. .................. 144/252.1; 144/218; 144/251.1; 144/228; 144/240; 409/137; 451/451; 451/456
(58) Field of Search ................ 15/179, 180; 144/251.1, 144/252.1, 218, 228, 240; 409/131, 137, 228; 451/94, 508, 521, 459, 549; 83/100; 51/456, 451

(56) References Cited

U.S. PATENT DOCUMENTS 5,545,082 A * 8/1996 Courson et al. ............. 451/456
6,280,309 B1 * 8/2001 Van Osenbruggen ... 451/549 X
6,361,424 B1 * 3/2002 Manor et al. ................ 451/490

OTHER PUBLICATIONS

"Concluding Report on the Development of Moulding Tools Incorporating Internal Chip Removal", Institute of Wood and Paper Engineering of the Technical University of Dresden, Apr. 27, 1999.

* cited by examiner

Primary Examiner—W. Donald Bray
(74) Attorney, Agent, or Firm—Nath & Associates PLLC; Gary M. Nath

(57) ABSTRACT

The invention relates to a treatment unit with a cutting tool (1) for treating wood, plastic or the like. Said treatment unit comprises a suction hood (6) with a ring (17) that encircles the tool (1) completely in the circumferential direction and at least partially in the axial direction. The suction hood (6) is located on the side of the drive spindle of the tool (1). A chip receiving opening (10) is provided in the tool (1) in the vicinity of the blade (4), said opening traversing the tool (1) in both the axial and the radial direction. A chip formed at the blade (4) is transported through the chip receiving opening (10) to the suction hood (6) from where the chip is removed by air suction.

16 Claims, 3 Drawing Sheets

MACHINING ASSEMBLY INCLUDING A ROTATING TOOL AND EXHAUST HOOD

This is a continuation of application No. PCT/EP00/08630, filed Sep. 2, 2000.

TECHNICAL FIELD

The present invention relates to a machining assembly including a cutting tool for machining wood, plastics or the like which is connected to an exhaust hood to permit optimum chip removal. More particularly, the present invention relates to a machining assembly as put to use for machining board or panel-type workpieces in a fixed arrangement or on the fly. If the chips fail to be exhausted optimally from such tools the machined surface can be marred by the remaining chips, which is undesirable.

PRIOR ART

Conventionally, chips resulting from machining wood, plastics or the like such as, for example, wood-replacement or composite materials are exhausted via an exhaust device in the vicinity of the action site between cutter and workpiece. Experience has shown such an exhaust to be inadequate, however, resulting in chips partly being cat multiply which reduces the useful life of the cutting tools, or leaves the machined workpiece surface marred. Known furthermore are the problems involved with cemented materials, often resulting in a conglomerate of cement and chips which may lead to clumping greatly obstructing chip removal as a whole.

From the concluding report on the development of molding tools incorporating internal chip removal by the Institute of Wood and Paper Engineering of the Technical University of Dresden, delivered Apr. 27, 1999 a molding tool is known comprising a chip receiving opening sited directly before the cutter. The chip receiving opening is connected to a cavity in the interior of the tool, the cavity in turn features an axial ejection opening for chip removal which is open to the side facing away from the drive spindle. In the tool cavity of the molding tool a cylindrical or conical insert is provided fixed in the frame and which is adapted thin-walled to the internal shape of the tool, whereby at least one window is provided in the active site of the tubular insert. In addition, located at the inner side of the tubular insert downstream of the chip window is a slanting guide element extending over the fall width of the tubular insert. In this way, chips can be exhausted from the active site trough the tool to the side facing away from the spindle driving the tool. The tool itself in this arrangement is penetrated only in the radial direction.

Known furthermore are machining assemblies whose tools comprise several aims provided with cutters with which the workpieces can be machined. Exhausting the resulting chips in this arrangement is done via an exhaust hood arranged at the drive spindle side of the tool. The exhaust hood features a substantially U-shaped configuration so that the exhaust hood is totally open in one direction. Exhausting air and chips from the exhaust hood in this arrangement is done at the side opposite the opening of the exhaust hood.

SUMMARY OF THE INVENTION

The present invention is based on the technical problem of providing a machining assembly including a cutting tool effectively permitting optimum chip removal with minimum complication in fabrication and low operating costs whilst preventing chip clumping.

This objective is achieved by a machining assembly having the features as set forth in claim 1.

The gist of the present invention is to exploit the natural direction of chip motion materializing at the cutter of a cutting tool for its removal. For this purpose a portion of a disk-shaped section of the cutting tool adjoining the cutter thereof is now penetrated for the first time both axially and totally radially by a chip receiving opening.

At the same time, a fixed exhaust hood arranged coaxial to the rotating tool and at its machine spindle side is provided with a likewise fixed ring extending almost filly up to the cutters of the tool so that only a minor gap remains between the cutters and the ring on the exhaust hood. The exhaust hood with the ring arranged thereon totally encircles the tool circumferentially and at least in part axially in thus effectively preventing accumulation or clumping of chips or conglomerations of chips and cement. The chips materializing at the cutter are directed axial into a quill of the tool through the chip receiving opening in practically preventing them from coming into contact with the rotating tool. In this arrangement, the direction of chip motion materializing at the cutter is supported by the air being exhausted from the exhaust hood. Due to the air being swirled in the region of the chip receiving opening as well as the air being exhausted from the exhaust hood the chips are prevented from becoming deposited at the ring of the exhaust hood directly adjoining the cutters. Should deposits of chips or a conglomerate of chips and cement nevertheless occur at this ring, these are always mechanically removed by the tool itself with the edge defining the chip receiving opening, in thus considerably improving chip removal whilst effectively preventing clumping or blockage by a conglomerate of chips and cement.

It is in this way that the chips materializing at the cutter of the tool can be removed particularly effectively from the cutting tool since the natural direction of chip motion is supported by the exhaust air flow. At the same time, the volume of air to be exhausted can be maintained small since the chips do not need to be deflected by the air flow. Removing the chips axially through the tool offers the additional advantage that the geometry of the side of the tool facing the workpiece can now be freely configured without needing to taking into account chip exhaust in this area. This also prevents chips from coming into contact with the workpiece to be machined or the already machined surface thereof. Such machining assemblies in accordance with the invention are particularly suitable for machines working on the fly.

In accordance with one preferred embodiment of the present invention the exhaust hood can be adapted variable to the diameter of the disk-shaped section of the cutting tool so that the width of the gap between the disk-shaped section of the cutting tool and the inner edge of the exhaust hood remains a minimum. This is achievable, for example, via an annular insert adapted to the inner diameter of the exhaust hood at the outer diameter of the disk-shaped section of the tool. By minimizing the gap between the cutting tool and the exhaust hood an unnecessarily high exhaust capacity of the exhaust hood is avoided in thus achieving reduced operating costs.

Preferably, the exhaust opening in the cowled exhaust hood, via which air and chips are removed from the cowled exhaust hood, is arranged staggered by 20° to 150° in the direction of motion of the tool cutter relative to the chip production site, an arrangement being particularly preferred in which the exhaust hood is arranged staggered by 90° in the direction of motion of the tool cutter relative to the chip production site. This permits assuring that, in addition to the natural motion of the chip in the axial direction, the motion of the chip in the radial direction generated by the centrifugal forces is made use of for chip removal. The air exhaust through the opening in the cowled exhaust hood is thus able to optimally support and boost the natural direction of motion of the chip in thus permitting effective chip removal.

BRIEF DESCRIPTION OF THE DRAWINGS

Advantageous embodiments of the present invention will now be explained and described in more detail purely by way of example with reference to the attached drawings in which.

DESCRIPTION OF PREFERRED EMBODIMENTS OF THE INVENTION

Figure 1:
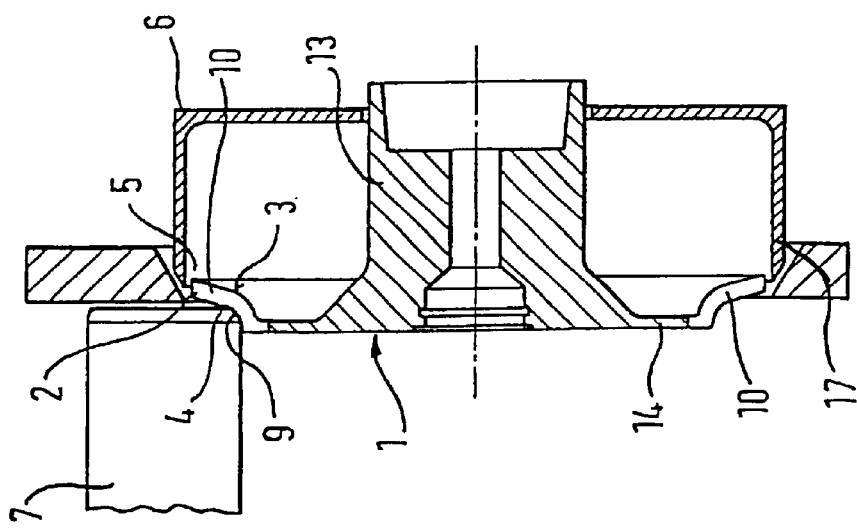
FIG. 1 is a diagrammatic illustration of a tool in accordance with the invention including an exhaust hood in accordance with a first embodiment of the present invention.

Referring now to FIG. 1 there is illustrated diagrammatically a first embodiment of the invention. The cutting tool 1 is formed substantially by a cylindrical connector 13 for receiving the spindle of a machine tool (not shown) as well as a substantially disk-shaped section 14 connected thereto. Arranged in the radial outer portion of the disk-shaped section 14 are several cutters 4 in the circumferential portion of the cutting tool 1. The spindle-side inner contour 3 of the tool 1 matches the contour of the cutter 4, resulting in a quill at the side facing the tool spindle. FIG. 1 shows the tool 1 cutting a workpiece 7 to be machined.

Positioned coaxially with the cutting tool 1 is an exhaust hood 6 which encircles the portion of the disk-shaped section 14 adjoining the workpiece 7 as well as of the cylindrical connector 13. In this arrangement, the exhaust hood 6 is fixedly located whilst the cutting tool 1 is rotatably mounted by the spindle of a machine tool (not shown). In the left-hand portion of the exhaust hood 6 as shown in FIG. 1 a ring 17 is provided encircling the tool 1 circumferentially totally and axially in part in closely adjoining the cutter 4. The extent to which the tool 1 is encircled by the ring 17 axially is defined by the workpiece 7 whose surface facing the ring 17 defines a minimum air gap therewith. At the same time, the ring 17 attached to the exhaust hood 6 forms together with the outermost circumferential edge of the tool 1 a gap which is selected so that contact between the tool 1 and the ring 17 of the exhaust hood 6 is prevented even in dynamic motion and in machining of the workpiece 7.

As evident from FIG. 1 an outer ring 2 of the tool 1 formed by the disk-shaped section 14 and adapted to the contour of the cutters 4, is discontinued portionally so that a chip receiving opening 10 is formed. This is particularly evident, for example, in FIGS. 5 and 6 each showing the tool 1 as depicted in FIG. 1 but without the exhaust hood 6 and the workpiece 7 to be machined. The axial angle 11 as well as the cutting angle 12 are selected as a function of the contour of the chip receiving opening 10 so that a chip materializing at the cutters 4 has unrestricted freedom of motion, i.e. it being conveyed in its natural direction of motion into a cavity formed by the exhaust hood 6 and the tool 1. In this arrangement, the chip does not come into contact with the basic body of the tool 1 in thus enabling it to enter unobstructed into the cavity formed by the exhaust hood and the tool.

Figure 5:
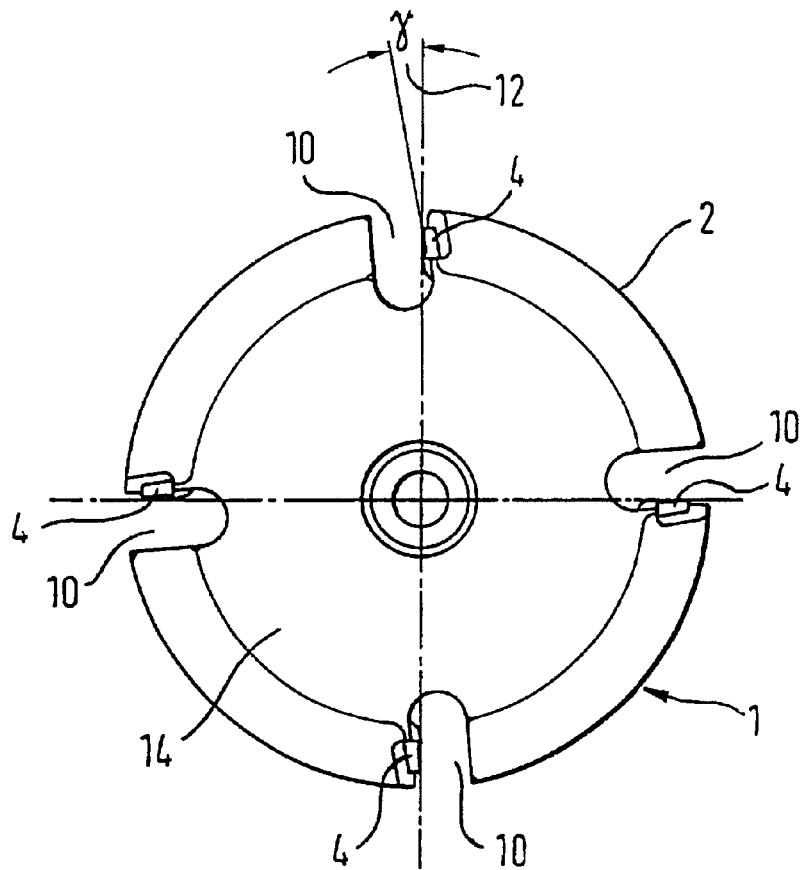
FIG. 5 is a diagrammatic plan view of the side of a tool in accordance with the invention facing a workpiece as shown in FIG. 1 but without the exhaust device.
Figure 6:
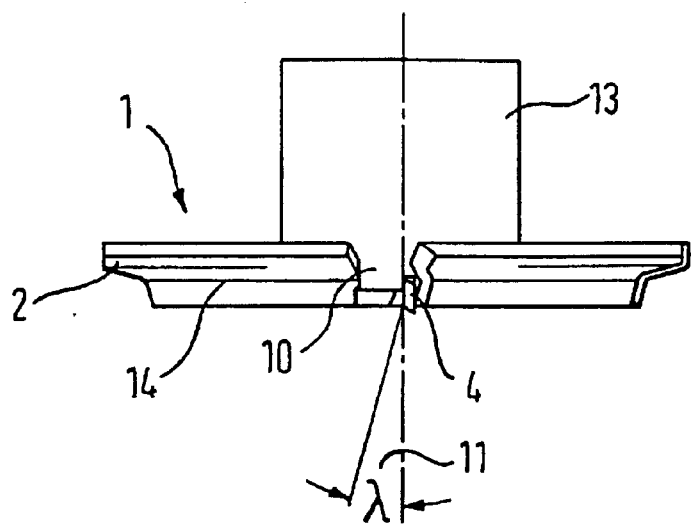
FIG. 6 is a diagrammatic side view of the tool as shown in FIG. 5.

Referring now to FIG. 5 there is illustrated how the chip receiving opening 10 is sized to permit unobstructed passage of the chip axially through the tool 1. In the preferred embodiment as shown in FIGS. 5 and 6 four cutters 4 are equidistributed about the circumference of the tool 1. In this arrangement, the chip receiving openings 10 are configured substantially U-shaped, the U channels being open to the outer circumferential side of the tool 1, although, of course, depending on the application of the tool 1 other configurations of the chip receiving opening 10 or orientations thereof are just as conceivable. The number of cutters 4 provided on the tool 1 is also not restricted to four; instead any number of cutters 4 may be provided at the tool 1, although in general preference is given to two to eight cutters equispaced about the circumference of the tool 1. Depending on the geometry of the cutter the chip receiving opening 10 can be varied in shape, width and length whilst taking into account that optimum chip removal needs to be assured by the chip receiving opening 10 whilst avoiding weakening of the tool by configuring the chip receiving opening 10 too large. In addition to this, the larger the chip receiving opening 10 the higher also the air volume exhausted through the exhaust hood 6 for the same air exhaust velocity.

Air is exhausted at a location (not shown) from the exhaust hood 6 as shown in FIG. 1 so that the chips having attained the cavity between the exhaust hood 6 and the tool 1 can be exhausted together with the air from the exhaust hood 6. At the same time, the direction of motion of the chips is intensified by the air exhaust from the exhaust hood 6 since the chips are drawn through the chip receiving opening 10 into the outer ring 2 of the tool 1.

The exhaust hood 6 is configured so that a gap formed between the cylindrical connector 13 of the cutting tool 1 and a central opening in the exhaust hood 6 is a minimum, this likewise applying to the gap between the circumferential edge of the outer ring 2 of the tool 1 and the inner circumferential surface area of the exhaust hood 6. This permits preventing chips deflected within the exhaust hood 6 from emerging from the cavity formed by the exhaust hood 6 and the tool 1 at an undesirable location and thus resulting in a deterioration of the finish or in soilage. At the same time, minimizing the width of the gap between the exhaust hood 6 and the tool 1 enables the suction capacity of the air exhaust from the exhaust hood 6 to be minimized.

As evident from FIGS. 1 and 6, for example, the inner contour 3 of the outer ring 2 is adapted to the geometry of the cutters 4 in thus avoiding chips being deposited in the cavity formed by the exhaust hood 6 and tool 1. In addition, this enables the wall thickness of the outer ring 2 to be minimized. To support the direction of motion of the chips the inner contour 3 in the shape of a truncated cone is preferred as shown in FIGS. 1 and 2, for example.

Figure 2:
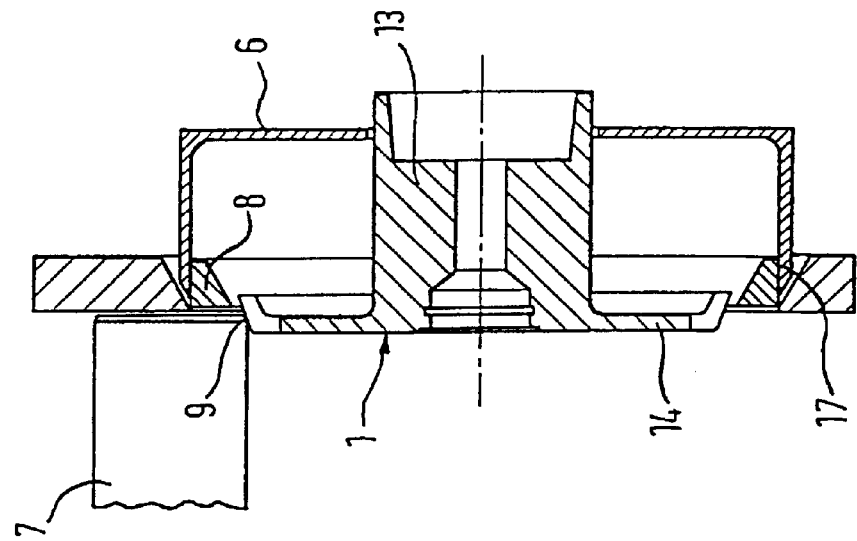
FIG. 2 is a diagrammatic illustration of a tool in accordance with the invention including an exhaust hood in accordance with a second embodiment.

Referring now to FIG. 2 there is illustrated a further embodiment of an exhausted tool in accordance with the invention. Compared to the tool 1 as shown in FIG. 1 the tool illustrated in FIG. 2 is configured with a smaller diameter of the disk-shaped section 14. The exhaust hood 6 as evident from FIG. 2 is identical to the exhaust hood 6 illustrated in FIG. 1. To avoid an excessively large gap materializing to the ring 17 of the exhaust hood 6 due to the small diameter of the disk-shaped section 14 of the tool 1, a further ring 8 is adapted inside the exhaust hood 6 so that the gap between the further ring 8 and the tool 1 is a minimum. This ensures that the air exhaust through too large a gap between the exhaust hood 6 and the tool 1 into the cavity formed by the tool 1 and exhaust hood 6 is not excessive. This avoids an excessively high suction capacity being needed to remove the chips and air. Preferably, various flirter rings 8 can be adapted in the exhaust hood 6 and 17 respectively in accordance with the size of the tool in each case.

Figure 3:
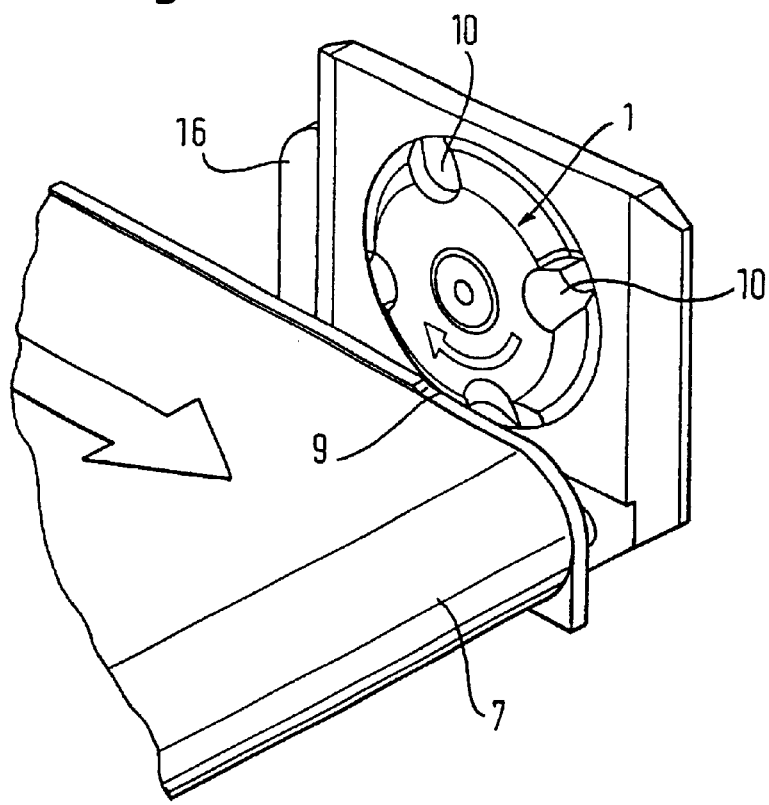
FIG. 3 is a diagrammatic three-dimensional illustration of a further embodiment of a tool in accordance with the invention including exhaust hood.

Referring now to FIG. 3 there is illustrated a three-dimensional diagrammatic illustration of a tool in accordance with the invention including an exhaust hood. In the condition as shown in FIG. 3 the cutting tool 1 is cutting a workpiece 7. As already explained with reference to FIGS. 1 and 2 a chip produced at the cutting site 9 of the cutters 4 is transported through the chip receiving openings 10 into a cavity formed by the exhaust hood 6 and the tool 1. In this arrangement, the chip is moved substantially in accordance with its natural direction of motion due to the cutting action without coming into contact with the base body of the tool 1. The exhaust hood 6 is connected via an exhaust opening (not shown in FIG. 3) to an exhaust passage 16, through which air and chips are exhausted from the cavity formed by the exhaust hood 6 and tool 1.

Figure 4:
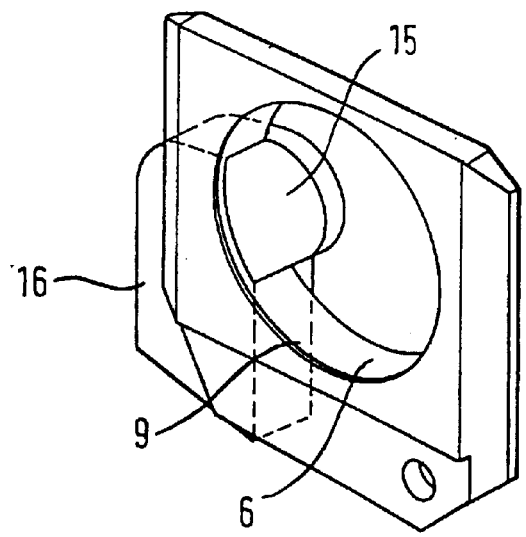
FIG. 4 is a diagrammatic three-dimensional view of the exhaust hood as shown in FIG. 3, the tool having been omitted to make for a better overview.

Referring now to FIG. 4 there is illustrated an exhaust hood 6 together with the exhaust passage 16 connected thereto, the cutting tool 1 itself being omitted to make for a better overview. From the diagrammatic illustration as shown in FIG. 4 it is evident that the exhaust passage 16 is connected to the exhaust hood 6 via an exhaust opening 15. In this arrangement, the exhaust opening 15 is arranged staggered from the cutting site 9 of the cutters 4 as indicated in FIGS. 3 and 4. The exhaust opening 15 of the exhaust hood 6 is arranged staggered in a range 20° to 150° in the direction of motion of the cutters 4 of the tool 1, an arrangement being particularly favorable in which the exhaust opening 15 is arranged staggered by 90° in the direction of motion of the tool cutter relative to the cutting site 9 of the cutters 4. This results in the chips materializing at the cutting site 9 of the cutters 4 flying away also radially in addition to their substantially axial direction of motion due to the centrifugal forces involved so that the exhaust of air and chips from the exhaust hood 6 by the arrangement of the exhaust opening 15 as shown in FIG. 4 is supported.

In FIGS. 1 and 2 the ring 17 is arranged substantially at the outer side of the exhaust hood 6 as a separate component, although of course it is just as possible to arrange the ring 17 at the inner circumferential side of the exhaust hood 6 and/or to configure it integrally therewith, as long as it is assured that for universal application of the exhaust hood 6 with various corresponding tool sizes further rings 8 can be secured to the exhaust hood 6 or ring 17.

What is claimed is:

1. A machining assembly for machining a workpiece, comprising a rotating cutting tool (1) including at least one cutter (4), a portion (2) of the tool (1) adjoining the cutter (4) being fully penetrated both axially and radially by a chip receiving opening (10) for communicating chips into a quill of the tool (1), and a fixed exhaust hood (6) arranged coaxial to the tool (1) and encircling the tool at least in part at a drive side of the tool (1), the exhaust hood (6) connecting an exhaust air source and a ring (17) fixedly arranged at the exhaust hood (6) encircling the tool (1) completely circumferentially and at least in part axially, closely adjoining the cutter (4).

2. The machining assembly as set forth in claim 1, characterized in that the ring (17) is arranged at an outer circumferential side of the exhaust hood (6).

3. The machining assembly as set forth in claim 1, characterized in that the ring (17) is arranged at an inner circumferential side of the exhaust hood (6).

4. The machining assembly as set forth in claim 1 characterized in that the ring (17) is integrally configured with the exhaust hood (6).

5. The machining assembly as set forth in claim 1, characterized in that an exhaust opening (15) connecting the exhaust hood (6) via an exhaust passage (16) to the exhaust air source is arranged staggered in a direction of motion of the cutter (4) of the rotating tool (1) relative to a cutting site (9) of the cutter (4) with the workpiece (7).

6. The machining assembly as set forth in claim 1, characterized in that a side of the tool (1) facing the exhaust hood (6) comprises a contour (3) adapted to a contour of the cutter (4).

7. The machining assembly as set forth in claim 1, characterized in that a side of the tool (1) facing the exhaust hood (6) has a contour shaped as a truncated cone.

8. The machining assembly as set forth in claim 1, characterized in that a further ring (8) for reducing an inner diameter of the exhaust hood (6) can be mounted on the ring (17) of the exhaust hood (6).

9. The machining assembly as set forth in claim 8, characterized in that the ring (17) of the exhaust hood (6) or of the further ring (8) secured thereto is located near to a cutting site (9) of the tool (1) with the workpiece.

10. The machining assembly as set forth in claim 5, characterized in that the exhaust opening (15) is radially arranged on the exhaust hood (6).

11. The machining assembly as set forth in claim 5, characterized in that the exhaust opening (15) is arranged tangentially to the exhaust hood (6).

12. The machining assembly as set forth in claim 5, characterized in that the exhaust opening (15) is arranged staggered by 20° to 150° in the direction of motion of the cutter (4) relative to the cutting site (9) of the cutter (4).

13. The machining assembly as set forth in claim 12, characterized in that the exhaust opening (15) is arranged staggered by approximately 90° in the direction of motion of the cutter (4) relative to the cutting site (9) of the cutter (4).

14. The machining assembly as set forth in claim 1, characterized in that the chip receiving opening (10) is configured substantially U-shaped as viewed in an axial direction of the tool (1).

15. The machining assembly as set forth in claim 14, characterized in that the U-shaped chip receiving opening (10) is oriented radially open outwards as viewed in the axial direction of the tool (1).

16. The machining assembly as set forth in claim 1, characterized in that two to eight cutters (4) are arranged equispaced about a circumference on the tool (1).

* * * * *